United States Patent [19]

Kotlarchik, Jr. et al.

[11] 4,064,168
[45] Dec. 20, 1977

[54] N-(VINYLPHENYL) SULFONAMIDES

[75] Inventors: Carl Kotlarchik, Jr.; Louis M. Minsk; George L. Fletcher, Jr., all of Rochester, N.Y.

[73] Assignee: Eastman Kodak Company, Rochester, N.J.

[21] Appl. No.: 752,367

[22] Filed: Dec. 20, 1976

Related U.S. Application Data

[62] Division of Ser. No. 541,678, Jan. 16, 1975, Pat. No. 4,032,518.

[51] Int. Cl.$^2$ .................. C07C 143/75; C07C 143/79
[52] U.S. Cl. .................. 260/556 A; 260/556 AR; 260/556 F
[58] Field of Search .................. 260/556 A, 556 AR

[56] References Cited

U.S. PATENT DOCUMENTS

| | | |
|---|---|---|
| 2,699,392 | 1/1955 | Herrick, Jr. et al. ... 260/29.6 RW X |
| 3,070,443 | 12/1962 | Neugebauer et al. .... 260/556 AR X |
| 3,143,558 | 8/1964 | Kresse et al. ............. 260/556 AR X |
| 3,234,190 | 2/1966 | Tashlick .................... 156/327 X |
| 3,814,604 | 6/1974 | Hertler ..................... 260/556 AR X |
| 3,980,713 | 9/1976 | Matsunaga et al. ...... 260/556 AR X |

FOREIGN PATENT DOCUMENTS 2,352,348  5/1974  Germany.

OTHER PUBLICATIONS

Hurd et al., CA 52:8065d (1958).
Dickey et al., CA 47:9358a (1953).
Sharpless et al., J. Org. Chem., vol. 41, No. 1, 1976, (p. 176–177).

*Primary Examiner*—Daniel E. Wyman
*Assistant Examiner*—Thomas A. Waltz
*Attorney, Agent, or Firm*—Arthur H. Rosenstein

[57] ABSTRACT

Novel N-(vinylphenyl)sulfonamides and polymers thereof including copolymers of N-(vinylphenyl)sulfonamides and styrene are prepared by reacting 4-vinylaniline with an amine and a sulfonyl chloride in the presence of an acid acceptor to produce the monomer to be polymerized. The homo- and copolymers of these N-(vinylphenyl)sulfonamides are useful as vesiculating matrices in vesicular elements.

4 Claims, No Drawings

N-(VINYLPHENYL) SULFONAMIDES

This is a division of application Ser. No. 541,678, filed Jan. 16, 1975, now U.S. Pat. No. 4,032,518.

This invention relates to novel polymerizable monomers of N-(vinylphenyl) sulfonamides and novel polymers produced therefrom. The polymers are useful in vesicular photography.

Vesicular images are formed in a photographic film by small bubbles or vesicles of gas which are formed and trapped in the areas of the film exposed to light and which refract light. Generally speaking, the film has a colloid or a resin coating or vehicle on a backing material and a light-sensitive agent or sensitizer, most commonly a diazo compound, dispersed throughout the coating. When the film is exposed to light, the sensitizer releases molecules of a gas; nitrogen in the case of diazo compounds. These do not form vesicles immediately, but they do so when the film is heated, presumably because the vehicle is relaxed sufficiently on heating for the gas molecules to form bubbles and for the bubbles to expand. The resulting vesicles make the vehicle opaque to transmission of light in the exposed areas and also reflect and scatter light so that they appear white.

The earliest vesicular materials employed gelatin as the vehicle. It was found, however that the resultant vesicular images faded rapidly when gelatin was used as the vehicle. Although gelatin has the desired gas permeability value, it is humidity sensitive and tends to absorb atmospheric moisture and become soft. This causes the vesicles to collapse, destroying the image.

Improvements in the above process were described in U.S. Pat. No. 2,702,756, wherein the gelatin binder was encapsulated in a hydrophobic resin, such as polystyrene and in U.S. Pat. No. 2,699,392, wherein the coated layer is initially hydrophobic but was treated to render the surface hydrophilic to allow it to absorb sensitizer from an aqueous solution. These improved processes also exhibited high solvent retention, moisture pick-up and poor image stability.

Copolymers of vinylidene chloride have also been suggested as vesicular binders. However, vinylidene chloride is very hazardous tending to form peroxides and phosgene in contact with air, which may explode on heating. Further, the vinylidene chloride in the copolymer is unstable producing free hydrogen chloride even at normal ambient conditions with consequent corrosion of metallic apparatus (microfilm viewers or printer components) which the vesicular film may contact.

Vesicular binders based on α-chloroacrylonitrile homopolymers or copolymers have exhibited fewer corrosion problems than vinylidene chloride binders but have exhibited lower sensitivity.

Therefore, it is an object of the invention to provide new polymers for use as vesiculating binders.

It is another object of the invention to provide novel monomers from which the above-mentioned polymers may be formed.

It is still another object of the invention to provide novel copolymers useful as vesiculating binders.

Other objects of this invention will become apparent from an examination of the specification and claims which follow.

In accordance with this invention, there are provided novel N-(vinylphenyl) sulfonamide monomers from which polymers useful as vesicular binders may be formed. The novel monomers of this invention can be represented by the formula:

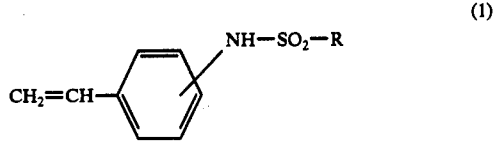

wherein

R is selected from the group consisting of alkyl containing from 1 to 10 carbon atoms, such as methyl, ethyl, isopropyl, butyl, pentyl, hexyl, heptyl, octyl, 2-methylhexyl, nonyl, decyl and the like; and aryl containing from 6 to 10 carbon atoms such as phenyl, naphthyl, and the like.

R may also include substituted alkyl such as haloalkyl such as chloromethyl, and substituted aryl such as bromophenyl, tolyl, xylyl, biphenyl, and the like. Any substituent may be used which does not adversely affect the vesicular properties of the polymers or copolymers formed from the monomers.

The novel monomers of the invention can be prepared by condensing a vinylaniline such as a commercially available vinylaniline, e.g., p-vinylaniline with a sulfonyl chloride such as methanesulfonyl chloride or benzenesulfonyl chloride in the presence of an acid acceptor such as triethylamine. The reactants can be reacted at temperatures of from 40° C to 100° C. The reactants are generally reacted in mole ratios of 1 to 1.

Examples of N-(vinylphenyl) sulfonamides useful herein are N-(vinylphenyl)methanesulfonamide, N-(vinylphenyl)-benzenesulfonamide, N-(vinylphenyl)-p-toluenesulfonamide and the like.

The novel N-(vinylphenyl)sulfonamide monomers of this invention can be homopolymerized or copolymerized with at least one other ethylenically unsaturated monomer. The copolymers of this invention preferably contain from about 70 to about 100 mole percent of the repeating unit derived from N-(vinylphenyl)sulfonamide.

The molecular weights of the polymers employed as vesicular binders according to the practice of this invention are subject to wide variations, but are often in the range of about 800,000 to about 1,200,000. The useful inherent viscosity range is measured at 25° C at a concentration of 0.25 gram of polymer per deciliter of solution in N,N-dimethylformamide and is generally from 1 to 1.9 and preferably from about 1.4 to about 1.75 and the polymer has a λ max no greater than about 350 nm in the spectral range of 200 to 750 nm. The λ max are determined by measuring untraviolet absorption peaks for each polymer in a Beckman model DB spectrophotometer, after dissolving the polymer in either spectrographic grade ethanol, or spectrographic grade methoxyethanol, and by visually examining the polymer coating to ascertain that no significant absorption occurs in the visible spectrum, i.e., in the range 400 nm to 750 nm.

The polymers of this invention contain recurring units of the following formula:

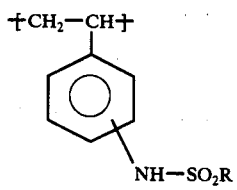

(2)

wherein R is as defined above.

A particularly useful class of polymers containing N-(vinylphenyl)sulfonamide units is prepared by copolymerizing a monomer of this invention having the structure of formula (1) with at least one other ethylenically unsaturated polymerizable monomer which forms addition polymers, such as vinyl esters, amides, nitriles, ketones, halides, ethers, alpha-beta- unsaturated acids or esters thereof, olefins, diolefins and the like, as exemplified by acrylamide, N-substituted acrylamide such as N,N-dimethylacrylamide and N-isopropylacrylamide, methacrylamides, methacrylonitrile, styrene, alpha-methylstyrene, vinyl chloride, methyl vinyl ketone, fumaric, maleic and itaconic esters, 2-chloroethyl vinyl ether, acrylic acid, acrylic and methacrylic esters such as methyl acrylate, ethyl methacrylate, N-butyl acrylate and phenyl methacrylate, sodium methacryloyloxyethyl sulfate, methacrylic acid, dimethylaminoethyl methacrylate, methylene group-containing monomers such as 2-acetoacetoxyethyl methacrylate, 6-(vinylphenyl)-2,4-hexanedione), ethyl acryloylacetate and the like, sulfonates such as 3-acryloyloxypropane-1-sulfonic acid, sodium salt, 2-acrylamido-2-methylpropane1-sulfonic acid, 4,4,9-trimethyl-8-oxo-7-oxa-4-azonia-9-decene-1-sulfonate, N-vinylsuccinamide, N-vinylphthalimide, N-vinylpyrazolidone, vinylpyridine, vinylimidazole, butadiene, isoprene, vinylidene chloride, ethylene and the like.

The preferred copolymer contains from about 70 to about 100 mole percent of N-(vinylphenyl)-sulfonamide units and from about 0% by mole to about 30 mole percent of other units depending upon the particular monomer used. Some examples of copolymers useful herein include poly[N-(vinylphenyl)methanesulfonamide-co-acrylamide], poly[N-(vinylphenyl)methanesulfonamide-co-N-(isopropylacrylamide)], poly[N-(vinylphenyl)-methanesulfonamide-co-vinylpryidine], poly[N-(vinylphenyl)-methanesulfonamide-co-styrene], poly[N-(vinylphenyl)-methanesulfonamide-co-n-butyl acrylate], poly[N-(vinylphenyl)-methanesulfonamide-co-6-(m- and p-vinylphenyl)-2,4-hexane-dione] and the like.

The monomers of this invention can be homo- or copolymerized by any of the techniques known in the art such as by bulk, solution or bead polymerization techniques. The bulk or solution polymerization techniques are preferred.

The temperature at which the copolymers described herein are prepared is subject to wide variations since this temperature depends upon such variable features as the specific monomer used, duration of heating, pressure employed and like considerations. However, the polymerization temperature generally does not exceed about 100° C., and most often it is in the range of about 50° to about 100° C. The polymerization can be carried out in a suitable vehicle, such as dimethyl sulfoxide. The pressure employed in the polymerization, if any, is usually only sufficient to maintain the reaction mixture in liquid form, although either superatmospheric or subatmospheric pressures can be used. The concentration of polymerizable monomer in the polymerization mixture can be varied widely with concentrations up to about 100% by weight and preferably about 50% to about 70% by weight based on the total weight of the mixture being satisfactory. Suitable catalysts for the polymerization reaction include, for example, the free radical catalysts, such as hydrogen peroxide, cumene hydroperoxide, water soluble axo type initiators and the like. In redox polymerization systems the usual ingredients can be employed. If desired, the polymer can be isolated from the reaction vehicle by freezing, salting out, precipitation or any other procedure suitable for this purpose.

The novel polymers of this invention may be mixed in solution with light-sensitive vesiculating agents such as 1,4-dicarbazidobenzene, p-(N,N-diethylamino)benzene diazonium fluoroborate, 2-carbazido-α-naphthol, 2,5-dimethoxy-4-morpholinobenzenediazonium hexafluorophosphate, and the like, and if necessary, addenda such as prenucleating agents, e.g., waxes or finely divided pigments or the like, and used in a vesicular element. The vesicular element generally comprises from about 89 to about 97 % by weight of the polymer, from about 2 to about 8% by weight of the vesiculating agent and from about 0.2 to about 3.0% by weight of the sensitizer. Various additional addenda such as pH stabilizers, such as sulfosalicyclic acid and plasticizers such as butyrolacetone, methoxyethanol, triphenylphosphate, and the like may be added to the vesicular element.

The vesicular composition is coated on a suitable support such as poly(ethylene terephthalate), cellulose acetate, oriented polystyrene, polycarbonate, or the like and exposed imagewise and developed by heating.

The following examples are included for a further understanding of the invention.

EXAMPLE 1

Preparation of N-(4-vinylphenyl)methanesulfonamide

To a solution of 500 g (4.2 moles) of 4-vinylaniline and 460 g (4.2 moles) of triethylamine in 1000 cc of anhydrous diethyl ether under a nitrogen atmosphere was added dropwise 478 g (4.2 moles) of methanesulfonyl chloride. The temperature of the reaction vessel was kept below 5° C by an ice bath during the course of the reaction. When addition was complete (40 min.), the mixture was stirred for an additional 2 hours and the contents of the flask then brought to room temperature. The mixture was filtered and extracted with 500 cc of 1.0 M HCl solution. The etheral portion was separated, dried and the ether removed on a rotary evaporator. The resulting oily solid was extracted with 500 cc of ethanol and recrystallized from ethane/water and then from toluene. 70–75% yield after recrystallization. M.P. = 97° C.

Anal. Calc'd for $C_9H_{11}NO_2S$: C, 54.8; H, 5.6; N, 7.1; S, 16.2; Found: C, 54.7; H, 5.8; N, 7.1; S, 16.6.

EXAMPLE 2

N-(4-vinylphenyl)benzenesulfonamide is prepared by the method described in Example 1 with the exception that benzenesulfonyl chloride is substituted for the methanesulfonyl chloride.

EXAMPLE 3

N-(4-vinylphenyl)-p-toluenesulfonamide is prepared by the method of Example 1 with the exception that o- or p-toluenesulfonyl chloride is substituted for the methanesulfonyl chloride.

EXAMPLE 4

Preparation of Poly[N-(4-vinylphenyl)methanesulfonamide]

A solution of 10 g (0.05 mole) of N-(4-vinylphenyl)-methanesulfonamide in 5 cc of dimethyl sulfoxide under nitrogen at 65° C was polymerized during an 18 hour period using 0.05 g (0.5%) 2,2'-azobis(2-methylpropionitrile) (AIBN) as catalyst. The product was precipitated into 2 l. of isopropyl alcohol, filtered, washed with 1 l. of water and dried.

Yield = 8.4 g. λ = 220

Anal. Calc'd. for $C_9H_{11}NO_2S$: C, 54.8; H, 5.6; N, 7.1; S, 16.2; Found: C, 53.9; H, 6.0; N, 6.9; S, 16.0.

EXAMPLE 5

Poly[N-(4-vinylphenyl)benzenesulfonamide] is prepared by the method described in Example 4 substituting the monomer of Example 2 for N-(4-vinylphenyl)-methanesulfonamide.

EXAMPLE 6

Poly[N-(4-vinylphenyl)-p-toluenesulfonamide] is prepared by the method of Example 4 substituting the monomer of Example 3 for N-(4-vinylphenyl)methanesulfonamide.

EXAMPLE 7

Preparation of Poly[styrene-co-N-(vinylphenyl)methanesulfonamide]

A solution of 20 g (0.1 mole) of N-(vinylphenyl)-methanesulfonamide and 5 g (0.05 mole) of styrene in 12.5 cc of dimethyl sulfoxide was heated to 65° C under a nitrogen atmosphere with addition of 0.125 g AIBN (0.5%) as catalyst for the copolymerization. The contents of the flask were allowed to polymerize for an 18 hour period before precipitating the polymer into 4 l. of isopropyl alcohol. The polymer was collected by filtration, rinsed with 1000 cc water and dried. Yield 20.4 g. The inherent viscosity measured at a concentration of 0.25 gram polymer/deciliter of solution in N,N-dimethylformamide at 25° C was 1.47 and λ was 218.

Anal. Calc3 d. for $C_{26}H_{30}NO_2S$: C, 60.9; H, 5.8; H, 5.5; S, 12.4; Found: C, 59.5; H, 5.7; N, 5.9; S, 13.6.

EXAMPLES 8–11

A series of copolymers were prepared by the method of example 3 varying the proportions of sulfonamide and styrene. The results are shown in Table I.

EXAMPLE 12

A vesicular element was prepared as follows:

One gram of poly[N-(vinylphenyl)methanesulfonamide] was dissolved in 9 grams of 2-methoxyethanol by stirring at room temperature. A clear solution of the polymer was formed. Seventy-five mg of 2-carbazido-α-naphthol (vesiculating agent) were dissolved in the polymer solution by stirring at room temperature. The solution of polymer and vesiculating agent was coated on a four mil poly(ethylene terephthalate) backing layer. The film was heated under air current to remove solvent. The photographic element was exposed to a 125 watt doped mercury arc spaced about 3 inches from the film, through an image-bearing transparency, for 18 seconds. The image was developed by heating for 10 seconds at 140° C. The image comprised both a vesicular image and a blue dye image. The projection density of the image was 2.34 and the visual diffuse density was 0.94.

EXAMPLE 13

The physical properties of the binder of Example 12 can be modified by copolymerization with other monomers as shown in the following example.

A solution was prepared containing 9.0 g of methoxyethanol and 10 g of the copolymer of N-(vinylphenyl)-methanesulfonamide with styrene having the following structure:

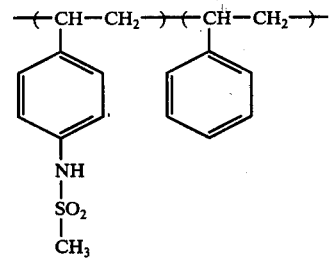

The styrene monomer constituted 20% of the polymer by weight. Seventy-five milligrams of 2-carbazido-α-naphthol were dissolved in the polymer solution along with 10 mg of Carbowax ® 4000 [poly(ethylene glycol) sold by Carbide and Carbon Chemicals Co.] The lacquer solution was coated on a 4 mil poly(ethylene terephthalate)backing layer. The film was warmed to 55° C to allow the solvent to evaporate. The dried film was exposed imagewise as described in Example 1. The image was developed by heating the film 3 seconds at 140° C. The resulting image had a density of 1.2.

The invention has been described in detail with particular reference to certain preferred embodiments thereof, but it will be understood that variations and

TABLE I

| Example | Moles of N-(vinylphenyl)-methanesulfonamide/ Moles of Styrene | Analysis (calc/found) | | | | Tg |
| --- | --- | --- | --- | --- | --- | --- |
| | | C | H | N | S | |
| 8 | 10/1 | 56.2/ 53.6 | 5.6/ 5.5 | 6.7/ 6.5 | 15.3/ 15.7 | 175° C |
| 9 | 4.5/1 | 58.2/ 58.5 | 5.8/ 6.0 | 6.3/ 5.9 | 14.4/ 15.1 | 171° C |
| 10 | 3/1 | 59.9/ 58.0 | 5.9/ 5.9 | 6.0/ 6.1 | 13.7/ 14.3 | 166° C |
| 11 | 2/1 | 62.2/ 59.5 | 6.0/ 5.7 | 5.6/ 5.9 | 12.7/ 13.6 | 164° C | modifications can be effected within the spirit and scope of the invention.

We claim:

1. A N-(vinylphenyl)sulfonamide having the formula:

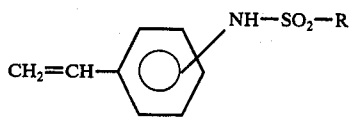

wherein R is selected from the group consisting of alkyl or substituted alkyl containing from 1 to 10 carbon atoms and aryl or substituted aryl containing from 6 to 10 carbons atoms, said substituents being selected from those which do not adversely affect the vesicular properties of any polymer or copolymer formed from said N-(vinylphenyl) sulfonamide.

2. The N-(vinylphenyl)sulfonamide of claim 1 wherein R is $CH_3$.

3. The N-(vinylphenyl)sulfonamide of claim 1 wherein R is $C_6H_5$.

4. The sulfonamide as defined in claim 1 wherein R is selected from haloalkyl, halophenyl and tolyl.